United States Patent
Gaboury et al.

(10) Patent No.: US 6,362,295 B2
(45) Date of Patent: *Mar. 26, 2002

(54) FLUOROPOLYMER POWDER COATINGS FROM MODIFIED THERMOPLASTIC VINYLIDENE FLUORIDE BASED RESINS

(75) Inventors: Scott R. Gaboury, Blue Bell, PA (US); Xavier F. Drujon, Jurancon (FR)

(73) Assignee: Atofina Chemicals, Inc., Phila., PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,511

(22) Filed: Jul. 16, 1998

Related U.S. Application Data

(60) Provisional application No. 60/052,811, filed on Jul. 17, 1997.

(51) Int. Cl.[7] .................... B32B 27/30; B05D 3/02
(52) U.S. Cl. ............... 526/255; 428/421; 525/199; 526/242; 526/250; 427/189; 427/195; 427/212; 427/222
(58) Field of Search .................. 428/421, 422; 526/242, 245, 250, 255; 427/180, 189, 195, 212, 222, 199, 385.5; 525/199

(56) References Cited

U.S. PATENT DOCUMENTS

| | | | |
|---|---|---|---|
| 4,778,862 A | * 10/1988 | Woo et al. | 525/479 |
| 4,946,889 A | 8/1990 | Akinori | 524/544 |
| 5,030,667 A | * 7/1991 | Shimizu et al. | 523/201 |
| 5,034,460 A | 7/1991 | Akinori | 525/72 |
| 5,223,562 A | * 6/1993 | Sagawa et al. | 524/275 |
| 5,229,460 A | * 7/1993 | Yousuf et al. | 525/198 |
| 5,346,727 A | 9/1994 | Simkin | 427/486 |
| 5,356,971 A | * 10/1994 | Sagawa et al. | 524/275 |
| 5,439,980 A | 8/1995 | Yutani et al. | 525/276 |
| 5,523,346 A | 6/1996 | Wu | 524/805 |

FOREIGN PATENT DOCUMENTS

| | | |
|---|---|---|
| EP | 0 360 575 A2 | 9/1989 |
| EP | 0 736 583 A1 | 10/1995 |
| JP | 3-124997 | 4/1991 |
| JP | 3-355973 | 12/1991 |
| JP | 4-97306 | 3/1992 |
| JP | 6-335005 | 12/1994 |
| JP | 7-63193 | 3/1995 |
| JP | WO 95/08582 | 3/1995 |

OTHER PUBLICATIONS

Chem Abstract, 93–474687, 1993.
Chem Abstract, 94–702216, 1994.
Derwent Abstract, 93–365461/46, 1993.
Derwent Abstract, 93–397686, 1993.
Derwent Abstract, 94–080169, 1994.
Derwent Abstract, 94–062223, 1994.
Derwent Abstract, 93–278324, 1993.
Derwent Abstract, 91–329278, 1991.
Derwent Abstract, 87–082345, 1987.
Derwent Abstract, 86–213626, 1986.
Derwent Abstract, 94–107015/13, 1994.
Derwent Abstract, 93–365288/46, 1993.

* cited by examiner

Primary Examiner—Vivian Chen
(74) Attorney, Agent, or Firm—William D. Mitchell

(57) ABSTRACT

An improved blend suitable for powder coating comprising an acrylic modified polyvinylidene fluoride polymer and pigment, processes for its preparation and use and coated articles produced there from are disclosed. Use of unpigmented acrylic modified fluoropolymers to form powder coating and objects so coated are also disclosed.

7 Claims, No Drawings

US 6,362,295 B2

FLUOROPOLYMER POWDER COATINGS FROM MODIFIED THERMOPLASTIC VINYLIDENE FLUORIDE BASED RESINS

This application claims priority from U.S. Provisional Application Serial No. 60/052,811 filed Jul. 17, 1997.

FIELD OF THE INVENTION

This invention relates to compositions of matter classified in the art of chemistry as seed polymers based on fluoropolymers, more specifically homo polymers of vinylidene fluoride (VDF) and copolymers of vinylidene fluoride with comonomers selected from hexafluoropropylene (HFP) tetrafluorethylene (TFE), chlorotrifluorethylene (CTFE), trifluoroethylene (TrFE), and/or vinylfluoride (VF), in combination with polymers based on acrylic acid, acrylic acid esters, methacrylic acid and/or methacrylic acid esters (acrylic polymers), to compositions containing them, more specifically to powder coating compositions containing them, and to processes for the preparation and use of the compositions containing the seed polymers of fluoropolymers and acrylic polymers and for the use of the fluoropolymer and acrylic polymer combinations themselves.

BACKGROUND OF THE INVENTION

There are a number of patents and publications describing PVDF homopolymer and copolymer based powder coatings made by alloying the fluoropolymer with acrylics. In all cases, the fluoropolymer, acrylics and pigment(s) are melt blended and the melt mixed product is ground. See, for example, U.S. Pat. No. 5,346,727 and references cited therein.

The present invention, by avoiding the necessity for melt blending the fluoropolymer, acrylic polymer and pigment, provides a powder coating composition already having the desired relatively uniform particle size or one which can be comminuted to the desired relatively uniform particle size without the necessity of cryogenic or low temperature grinding.

There are numerous published patents and patent applications worldwide which describe the use of particles in a latex of polyvinylidene fluoride homo- or co-polymers as seeds for the polymerization of various acrylic monomers to form latices from which aqueous based paints and other coatings materials are formed directly without isolation of the polymers from the latices. See, for example, U.S. Pat. Nos. 5,439,980, 5,034,460, 4,946,889 and 5,523,346, PCT Application WO 95/08582, EP 0736583A1, EP 0360575A2, Japanese Applications 6-335005 (8-170045), 3-124997 (4-325509), 3-355973 (5-170909), 4-97306 (5-271359), 7-63193 (8-259773) and the following abstracts—Chem. Abstr. 1994: 702216, Chem. Abstr. 1993, 474687, Derwent 94: 080169, Derwent 94: 062223, Derwent 93: 397686, Derwent 94: 107015/13, Derwent 93: 365288, Derwent 93: 365461, Derwent 93: 278324, Derwent 91: 529278, Derwent 87: 082345, Derwent 86: 213626 and the references cited in these publications. None of these publications teach or suggest isolation of the solids from the seed polymerization latex and subsequent use of the solids in formulating powder coating compositions. The present invention provides a more economical way to prepare fused powder coatings having physical properties equal to or better than those of prior art fused powder coatings.

DEFINITIONS

As used herein and in the appended claims, "acrylic modified fluoropolymer" ("AMF") means the solid resin (particles or agglomerated) prepared by polymerizing ethylenically unsaturated monomers selected from the group acrylic acid, acrylic acid esters, methacrylic acid, methacrylic acid esters and mixtures thereof in the presence of a latex of vinylidene fluoride homo- or co-polymers as described in more detail below.

SUMMARY OF THE INVENTION

The invention provides in a first composition aspect, an improved blend of polyvinylidene fluoride based polymer, acrylic polymer and pigment useful for powder coatings wherein the improvement comprises the polyvinylidene fluoride based polymer and acrylic polymer being combined as an acrylic modified fluoropolymer.

Special mention is made of tangible embodiments of the first composition aspect of the invention wherein the pigment is combined with the acrylic modified fluoropolymer when the acrylic modified fluoropolymer is suspended as a latex.

Special mention is made of tangible embodiments of the invention wherein the pigment is combined with the acrylic modified fluoropolymer by blending both ingredients as a dry powder.

The tangible embodiments of the first composition aspect of the invention possess the inherent applied use characteristic of being suitable for forming powder coatings on substrates, providing good uniform coatings with uniform distribution of pigment and good adherence while avoiding the necessity of a cryogenic or similar grinding step in their preparation.

The invention provides in a first process aspect a process for forming a composition of the first composition aspect of the invention comprising dispersing pigment in a latex of acrylic modified fluoropolymer to create a first mixture; recovering the solids from said first mixture to obtain the first composition aspect of the invention as a powder; and, if necessary, recovering the first composition aspect of the invention as a powder in the desired particle size range by a particle size selection process selected from grinding, sieving or a combination thereof.

The invention provides in a second process aspect a process for the preparation of a composition of the first composition aspect of the invention comprising; recovering the solids from an acrylic modified fluoropolymer latex as a coarse dry powder; if necessary, converting said coarse dry powder to a powder having the desired particle size by a process selected from grinding, sieving or a combination thereof; and combining said dry powder in the desired particle size with pigment particles in the desired particle size to obtain the first composition aspect of the invention.

The invention provides in a third process aspect, a process for the preparation of a composition of the first composition aspect of the invention comprising: combining the dry resin recovered from an acrylic modified fluoropolymer latex, said resin having the desired particle size, with pigment particles in the desired particle size.

The invention provides in a second composition aspect, an article of manufacture comprising a substrate coated on at least one surface thereof with a coating derived from the first composition aspect of the invention.

The invention provides in a fourth process aspect, a process for the preparation of an embodiment of the second composition aspect of the invention which comprises applying to at least one surface of a substrate on which a coating is desired, a layer of a composition of the first composition aspect of the invention and coalescing said layer to a fixed coating by application of heat.

The invention provides in a third composition aspect, an article of manufacture comprising a substrate having on at least one surface thereof a coating derived from an unpigmented acrylic modified fluoropolymer.

The invention provides in a fifth process aspect, a process for the preparation of an embodiment of the third composition aspect of the invention which comprises applying a layer of an unpigmented acrylic modified fluoropolymer powder coating composition to the substrate surface on which said coating is desired and coalescing said layer to a fixed coating application of heat.

An unpigmented acrylic modified fluoropolymer powder coating composition means an acrylic modified fluoropolymer or an acrylic modified fluoropolymer prepared as described in the Detailed Description of the Invention portion of the specification but without incorporation of pigment.

DETAILED DESCRIPTION OF THE INVENTION

The invention will now generally be described with reference to preferred embodiments thereof so as to enable one of skill in the art to make and use same.

The vinylidene fluoride homo- and co-polymer emulsions employed as starting materials are known, as are their methods of preparation. See, for example Humphrey and Dohany, Vinylidene Fluoride Polymers, Encyclopedia of Polymer Science and Engineering, 2nd Edition, Vol. 17, pp. 532 to 548, 1989, John Wiley and Sons, and the references cited therein. See also U.S. Pat. Nos. 3,857,827; 4,360,652; 4,569,978; 3,051,677; 3,178,399; 5,093,427; 4,076,929; 5,543,217; Moggi et al., Polymer Bulletin, 7, pp 115 to 122, (1982), Bonadardelli et al., Polymer, 27, pp. 905–909 (1986), Pianca, et al., Polymer, 28, pp 224 to 230 (1987), and Abusleme et al., European Patent Appln. No. 650, 982 A1. The latices so prepared may be homopolymer PVDF or copolymer PVDF with suitable monomers for copolymerization with VDF being selected from HFP, CTFE, TFE, TrFE, VF or mixtures thereof. HFP is a preferred comonomer.

Up to about 30% by weight comonomer(s) may be incorporated in PVDF polymers to make copolymers with from above about 0% to 20% by weight being preferred. Latices of terpolymers of VDF, particularly those of VDF, TFE and HFP may also be incorporated in the latex employed as starting materials for the acrylic modified fluoropolymer of the invention.

Use of emulsion or suspension polymerization in vertical or horizontal batch reactors or in continuous reactors is contemplated by the invention.

The acrylic and methacrylic monomers that are seed polymerized in the presence of the fluoropolymer latex are acrylic acid, acrylic acid alkyl esters, methacrylic acid and methacrylic acid alkyl esters wherein the alkyl group in the ester portion of the molecule is from 1 to about 10 carbon atoms, with from 1 to about 4 carbons being preferred.

Suitable acrylic esters include, without limitation, ethylacrylate, methylacrylate, butylacrylate, propylacrylate, isobutylacrylate, amylacrylate, 2-ethylhexylacrylate, and hexylacrylate. Suitable methacrylic acid esters include without limitation, ethyl methacrylate, methyl methacrylate, butyl methacrylate, propyl methacrylate, isobutyl methacrylate, amyl methacrylate, hydroxyethyl methacrylate, glycidylmethacrylate, and 2-ethylhexyl methacrylate. Preferred monomers are acrylic acid, methacrylic acid, ethylacrylate, methyl acrylate, butylacrylate and methyl methacrylate. The acrylic and methacrylic acid and ester monomers may be used singly or in combination.

For fine tuning properties of the final formed coating films, small quantities of other copolymerizable monomers and/or oligomers may be copolymerized with the acrylic and/or methacrylic acid and ester monomers. These include, without limitation, conjugated dienes, such as, 1,3-butadiene and isoprene, fluoroalkyl acrylates, fluoroacrylalkyl methacrylates, aromatic alkenyl compounds, such as, styrene, α-methylstyrene, styrene halides and divinyl hydrocarbon compounds, such as, divinyl benzene. Reactive emulsifiers, such as those available under the tradenames, Burenna, Eliminol, NK ester, may be used.

The total amount of acrylic acid, acrylic esters, methacrylic acid, methacrylic acid esters or mixtures thereof should be 80% or greater, preferably 90% or greater by weight of the total monomer mixture.

The total monomer mixture for polymerization or copolymerization in the presence of the fluoropolymer seed particles should be 10 to 200 parts by weight, preferably 20 to 100 parts by weight per 100 parts by weight of seed particles.

The seed polymerization can be carried out under the same conditions as for conventional emulsion polymerizations. The desired acrylic and/or methacrylic monomer(s) and a polymerization initiator and, optionally, a surfactant, a chain transfer agent, a pH regulator, and, also optionally, eventually a solvent and a chelating agent, are added to the seed latex, and reaction is carried out under atmospheric pressure, 0.5 to 6 hours at temperatures of 20 to 90° C., preferably 40 to 80° C.

The emulsion polymerization using the fluoropolymer as a seed can be performed according to standard methods:

Batch polymerization, wherein the monomer(s), the initiator and the other ingredients, if required, are added to the aqueous fluoropolymer dispersion from the beginning;

Semi-continuous polymerization, wherein a part or all of one of the ingredients is fed continuously or batch-wise during the reaction;

Continuous polymerization, wherein all the ingredients and the aqueous fluoropolymer dispersion are simultaneously fed into a reactor.

The ingredients may be added to the reactor neat, solubilized in a suitable solvent (organic or aqueous) or as a dispersion in a suitable solvent.

Use of all types of polymerization reactors (stirred tank, tubular, loop) is contemplated by the invention. A stirred tank reactor operating in the semi-continuous mode is preferred because of its convenience and flexibility.

The process used to manufacture the products of the invention involves at least two stages. At least one stage is required for the emulsion polymerization of the fluoropolymer and at least one is required for the seeded emulsion polymerization of the acrylic monomer(s).

These stages can be performed in the same reactor or different reactors. Each stage may contain its specific monomers, surfactant, initiator, chain transfer agent, pH regulator, solvent and/or chelating agents. It is preferred that the same reactor be employed for the various stages.

The final latex may be composed of dispersed particles, homogeneous in size and composition, or of dispersed particles having several populations of size and/or of composition. Latex having a homogeneous composition distribution of the dispersed particles is preferred. A broad particle size distribution, or a multi-modal particle size distribution allowing efficient packing of the particles, may be preferred to a homogeneous particle size distribution.

The final latex particle may be composed of one, two or more phases of various geometries such as homogeneous particle, core-shell, incomplete core-shell, inverse core-shell, half-moon, strawberry, interpenetrating network, etc. All these geometries and morphologies are well known in the art. Preferred morphology is homogeneous particle.

The surfactant that can be used includes anionic surfactants, cationic surfactants, non-ionic surfactants and amphoteric surfactants. They can be used separately or in combinations of two or more, with the proviso that obviously incompatible types cannot be combined. They can be mixed with the seed latex, or with the monomer mixture, or in any suitable combination with other polymerization ingredients. The anionic surfactant includes esters of higher alcohol sulfates (e.g. sodium salts or alkyl sulfonic acids, sodium salts of alkyl benzene sulfonic acids, sodium salts of succinic acids, sodium salts of succinic acid dialkyl ester sulfonic acids, sodium salts of alkyl diphenyether disulfonic acids). Suitable cationic surfactants are an alkyl pyridinium chloride or an alkylammonium chloride. The non-ionic surfactant includes polyoxyethylene alkyl phenyl ethers, polyoxyethylene alkyl ethers, polyoxyethylene alkyl esters, polyoxyethylene alkyl phenyl esters, glycerol esters, sorbitan alkyl esters, and derivatives thereof. A suitable amphoteric surfactant is lauryl betaine. Reactive emulsifiers, which are able to copolymerize with the above-mentioned monomers, can also be used (e.g. sodium styrene sulfonate, sodium alkyl sulfonate, sodium aryl alkyl sulfonate). The amount of surfactant usually used is 0.05 to 5 parts by weight per 100 parts by weight of total fluoropolymer particles.

Any kind of initiator which produces radicals suitable for free radical polymerization in aqueous media, for temperature from 20 to 100° C., can be used as the polymerization initiator. They can be used alone or in combination with a reducing agent (e.g. sodium hydrogenobisulfite, sodium L-ascorbate, sodium thiosulfate, sodium hydrogenosulfite). For example, persulfates, hydrogen peroxide, can be used as water-soluble initiators, and cumene hydroperoxide, diisopropyl peroxydicarbonate, benzoyl peroxide, 2,2'-azobis methyl butanenitrile, 2,2'-azobisisobutyronitrile, 1,1'azobiscyclohexane-1-carbonitrile, isopropylbenzenehydroperoxide can be used as oil-soluble initiators. Preferred initiators are 2,2'-azobis methyl butanenitrile and 1,1'-azobiscyclohexane-1-carbonitrile. The oil soluble initiator can be dissolved in a small quantity of solvent if desired. The amount of initiator used is 0.1 to 2 parts by weight per 100 parts by weight of the monomer mixture added.

The are no limitations in the type of chain transfer agents that can be used, as long as they do not excessively slow down the reaction. The chain transfer agents that can be used include for example mercaptans (e.g. dodecyl mercaptan, octylmercaptan), halogenated hydrocarbon (e.g. carbon tetrachloride, chloroform), xanthogen (e.g. dimethylxanthogen disulfide). The quantity of chain transfer agent used is usually 0 to 5 parts by weight per 100 parts by weight of the monomer mixture added.

A small quantity of solvent can be added during the reaction in order to help swell the seed particle. The quantity of solvent added should be in such ranges that workability, environmental safety, production safety, fire hazard prevention, are not impaired.

The quantity of pH adjusting agents (e.g. sodium carbonate, potassium carbonate, sodium hydrogen carbonate) and chelating agents (e.g. ethylene diamine tetraacetic acid, glycine, alanine) used are 0 to 2 parts by weight and 0 to 0.1 per 100 parts by weight of the monomer mixture added, respectively.

Additional amounts of surfactants or pH adjusting agents can be added to the final latex. This usually helps improve storage stability.

Isolation of the acrylic modified fluoropolymer resin from the seed polymer latex may be accomplished, when desired, by standard methods well known in the art such as, drying of the latex, coagulation by high shear mixing, centrifugation, and/or altering the ionic balance and/or freezing followed by filtration and optional washing and the like.

If it is desired to combine the pigment with the latex prior to isolation of the acrylic modified fluoropolymer from the latex, it may be blended in by standard methods known to be suitable for the purpose, such as, suspending the pigment particles in water, and adding the suspension to the latex with careful stirring to induce complete, uniform mixing.

Pigment may also be dry blended with the dry acrylic modified fluoropolymer after isolation of the latter from the latex. The same pigments useful in other PVDF based coatings may satisfactorily be used in the practice of the present invention. The pigments include, for example, those pigments identified in U.S. Pat. No. 3,340,222. The pigment may be organic or inorganic. According to one embodiment, the pigment may comprise titanium dioxide, or titanium dioxide in combination with one or more other inorganic pigments wherein titanium dioxide comprises the major part of the combination. Inorganic pigments which may be used alone or in combination with titanium dioxide include, for example, silica, iron oxides of various colors, cadmiums, lead titanate, and various silicates, for example, talc, diatomaceous earth, asbestos, mica, clay, and basic lead silicate. Pigments which may be used in combination with titanium dioxide include, for example, zinc oxide, zinc sulfide, zirconium oxide, white lead, carbon black, lead chromate, leafing and non-leafing metallic pigments, molybdate orange, calcium carbonate and barium sulfate.

The preferred pigment category is the ceramic metal oxide type pigments which are calcined. Chromium oxides and some iron oxides of the calcined type may also be satisfactorily utilized. For applications where a white coating is desired, a non-chalking, non-yellowing rutile-type of titanium dioxide is recommended. Lithopones and the like are inadequate as they suffer from lack of chalk resistance and/or from inadequate hiding. Anastase $TiO_2$ is similarly not recommended.

The pigment component, when present, is advantageously present in the composition in the amount of from about 0.1 to about 50 parts by weight per 100 parts of resin component. While for most applications the preferred range is from about 5 to about 20 parts by weight pigment per 100 parts of resin component.

Clear metallic pigmented coats will have very low amounts by weight of pigment.

The powder coating composition is prepared by mixing the acrylic modified fluoropolymer and the pigment together with any optional additives such as low molecular weight acrylic flow control agents, such as, those mentioned in U.S. Pat. No. 4,770,939.

As stated above mixing may take place by suspending the pigment in water and adding the suspension to the latex of the acrylic modified fluoropolymer with careful stirring.

The mixed solids may then be recovered from the latex by the previous mentioned standard techniques for doing so. The particle size in many cases can be controlled by the techniques of recovery of the solids from the latex and the drying technique employed. Such techniques are common in the art and will not be described in detail here.

The dried solids so recovered, if not within the desired particle size ranges may be ground if necessary at ambient temperature and classified by sieving.

Particle sizes less than 200 microns are preferred and very fine particles, less than 10 microns, should be avoided as they tend to interfere with transport of the powder in application equipment and contribute to excessive amounts of atmospheric dust. An alternative method of making the powder coating formulation is to recover the acrylic modified fluoropolymer from the latex as a dried powder by the above described conventional recovery methods and combine the dry pigment powder therewith. Classification to the desired particle size ranges, less than 200 microns, may be accomplished, if necessary, by ambient milling and sieving of the acrylic modified fluoropolymer powder and pigment either separately before blending or together after blending.

Any optional other additives such as flow control agents and the like may be incorporated at any stage, i.e., to the latex before recovery of the solids therefrom, to the dried latex, to the pigment or to the dried latex, pigment mixture before or after optional milling and classification.

As stated above, the acrylic modified fluoropolymer contemplates the inclusion of terpolymers of vinylidene fluoride among the copolymers of vinylidene fluoride contemplated as seed polymer starting materials.

The inclusion of the vinylidene fluoride, tetrafluoroethylene, hexafluoropropylene terpolymer of U.S. Pat. No. 5,346,727 in quantities up to about 5.0 weight percent of the seed polymer latex is contemplated, as is the inclusion of the terpolymers of European Patent Application 0659846A2. The terpolymers may be blended into the starting latex for seed polymer formation or seed polymers may be formed from them separately and the desired proportion blended into the formulation either at the latex or the dried powder stage.

The copolymers and terpolymers affect the melting point of the acrylic modified fluoropolymer and therefore AMF made from seed polymers having a melt viscosity, measured by ASTM D3835 at 232° C. and 100 $s^{-1}$ in the range of 2 to 3 Kpoise are preferred although higher melt flow viscosity materials are also suitable where higher coalescence temperatures for the coating are permissible.

The powder coating may be applied to the substrate by any known conventional application method which will provide a uniform coating. Typical techniques are fluidized bed, thermal spray, or preferably electrostatic coating.

The powder coating may be applied to the substrate with or without a primer coating. After application, the coating is subjected to a temperature above the melt temperature of the coating formulation, preferably between about 450° F. and 500° F. (232° to 260° C.) although with higher proportion of terpolymer included in the seed polymer it is possible to fuse the coatings at temperatures as low as 160° C.

Due to the high bake temperatures, the coatings are primarily useful as coatings on metal substrates and similar thermally stable substrates, such as, aluminum, steel, glass and ceramics. The applications of such coated substrates are primarily decorative where long term UW resistance, exterior durability, abrasion resistance and/or impact resistance are required. Typical examples are exterior metal building parts (window frames, door frames, roofing, wall panels and the like) and automotive components. Use as functional coatings (for corrosion and/or wear resistance, for example) is also contemplated.

One of skill in the art will understand that if it is desired to apply an unpigmented powder coating derived from the acrylic modified fluoropolymers to a substrate, the above described mode of practicing the invention with pigment may also be practiced with the pigment omitted.

The following examples further illustrate the best mode contemplated by the inventor for the practice of their invention and are intended to be illustrative and not in limitation thereof.

In the following examples, all proportions and percentages are by weight.

EXAMPLE 1

PVDF Homopolymer Based AMF Co-coagulated With Titanium Dioxide

Pigment Dispersion A 50.0 g DuPont ti-Pure R-960 ($TiO_2$)

50.0 g Distilled water 0.7 g Rohm and Haas Tamol 983 (polymeric acrylic dispersant)

Latex Blend A 100.0 AMF latex: 38% solids, PVDF (15 Kpoise)

(70 parts)/MMA/EA=(21 parts/9 parts)

11.4 g Pigment Dispersion A

Procedure:

Pigment dispersion A was milled for 1 hour with 100 g of 4 mm glass milling media prior to use. Latex blend A was prepared and slowly agitated 5 min. to homogenize followed by shear coagulation with a high speed dispersing blade at 3600 rpm for 5 min. The coagulated sample was dried at 35–40° C. for 24 hours. Dried sample was crushed and material passing through a 90 micron sieve was collected for use. The 90 micron powder was electrostatically sprayed onto aluminum substrates with negative polarity at 60–70 KV, and the powder was fused at 450° F. for 10 minutes. The coating obtained had an average roughness of 17.1 microns, and a 60 degree gloss of less than 10. Continuous film formation was noted at areas of thick film build.

EXAMPLE 2

PVDF/HFP Copolymer Based AMF Co-coagulated With Titanium Dioxide

Latex Blend B 100.0 g AMF latex: 47% solids, PVDF (63 parts)/HFP (7 parts)(24 Kpoise)(70 parts)/MMA/EA=(21 parts/9 parts)

7.0 g Pigment Dispersion A

Procedure

Preparation and application were as described in Example 1. The coating obtained had a very rough surface with low gloss (>10).

EXAMPLE 3

PVDF Homopolymer Based AMF Co-coagulated With Titanium Dioxide

Pigment Dispersion B
- 70.0 g DuPont TiPure R-60
- 30.0 g Distilled water
- 1.4 g Rohm and Haas Tamol 731A (polymeric acrylic dispersant)

Latex Blend C
- 100.0 g AMF latex: 43% solids, PVDF (2 Kpoise)(75 parts)/MMA/MAA=(23 parts/2 parts)
- 4.6 g Pigment Dispersion B Procedure Pigment dispersion B was milled for 1 hour with 100 g of 4 mm glass milling media prior to use. Latex blend C was prepared and slowly agitated 5 min. The coagulated sample was dried at 50° C. for 24 hours. Dried sample was crushed and material passing thought a 125 micron sieve was collected for use. The 125 micron powder was electrostatically sprayed onto aluminum substrates with negative polarity at 60–70 KV, and the powder was fused at 450° for 10 minutes. The coating obtained had continuous film formation over the entire panel with average roughness of 2.9 microns and a 60 degree gloss of 14.

EXAMPLE 4

PVDF Homopolymer Based AMF Dry Blended With Titanium Dioxide & Flow Additive Powder blend
AMF latex was coagulated at 4000 rpm for 5 min. with a high speed disperser and dried 24 hours at 50° C. The powder was used to prepare the following blend as well as the same blend with no ethylene carbonate.
- 20.0 g AMF powder: PVDF (2 Kpoise) (75 parts)/MMA/MAA=(23 parts/2 parts)
- 1.4 g DuPont TiPure R-960
- 0.2 g Ethylene carbonate Each powder blend was placed in a mini grinder for 20 seconds to achieve a homogeneously blended powder followed by sieving at 300 microns. The 300 micron powders were electrostatically sprayed onto aluminum substrates with negative polarity at 60–70 KV and fused at 450° for 10 minutes. Both powders produced continuous opaque white coatings, but the coating with ethylene carbonate was smoother (average roughness= 8.6 microns) than the coating without ethylene carbonate (average roughness=9.7 microns).

EXAMPLE 5

PVDF Homopolymer Based AMF Spray Dried

AMF latex: 50% solids, PVDF (8 Kpoise) (70 parts)/MMA/EA/MAA=(19.5 parts/9.5 parts/1.0 parts)

AMF latex was spray dried on a Buchi laboratory spray drier. Powder obtained from the cyclone collector was used without sieving for electrostatic powder spraying. The powder was electrostatically sprayed onto aluminum substrates with negative polarity at 60–70 KV and fused at 450° for 10 minutes. Films produced had continuous film formation over most of the panel with an average roughness of 4.3 microns.

EXAMPLE 6

PVDF/HFP Copolymer Based AMF Spray Dried

AMF latex: 50% solids, PVDF (63.7 parts)-HFP (6.3 parts) (25 Kpoise)(70 parts)/MMA/EA/MAA=(19.5 parts/9.5 parts/1.0 parts)

AMF latex was spray dried on a Bowen 30 inch spray drier. Powder obtained from the cyclone collector was used without sieving for electrostatic powder spraying. The powder was electrostatically sprayed onto aluminum substrates with negative polarity at 60–70 KV and fused at 450° F. for 10 minutes. Coatings produced were continuous at thicknesses of approximately 100 microns, and coatings had an even texturing across the entire surface with an average roughness of 9.6 microns.

EXAMPLE 7

PVDF Homopolymer Based AMF Co-spray Dried With Titanium Dioxide

Pigment Dispersion C
- 150.0 g DuPont TiPure R-960
- 50.0 g Distilled water
- 3.0 g Rohm and Haas Tamol 983

Latex Blend D
- 200 g AMF latex: 50% solids, PVDF (8 Kpoise)(70 parts) MMA/EA/MAA=(19.5 parts/9.5 parts/1.0 parts)
- 10 g Pigment Dispersion C The latex and pigment dispersion were blended and rolled slowly overnight to ensure thorough mixing. The mixture was spray dried on a Buchi laboratory spray drier. The cyclone collector material was sieved at 120 microns and electrostatically applied to aluminum substrates with negative polarity at 60–70 KV. The applied powder was fused at 450° F. for 10 minutes. The coating obtained was continuous and opaque with a 60 degree gloss of 38. The coating surface was smooth with an average roughness of 1.4 microns.

EXAMPLE 8

PVDF Homopolymer Based AMF Dry Blended With Carbon Black

Powder Blend
- 1000 g AMF Powder: PVDF (8 Kpoise) (70 parts)/MMA/EA/MAA=(19.5 parts/9.5 parts/1.0 parts) 3 g Cabot Sterling R carbon black AMF latex was spray dried on a Bowen 30 inch spray drier, and powder obtained form the cyclone collector was sieved at 125 microns prior to use. The AMF powder and carbon black were mixed at a Henschel high intensity mixer for a total time of 2 minutes at 2200 rpm. The resulting powder blend was electrostatically applied to steel substrates with positive polarity at approximately 30 KV and baked at 450° F. for 10 minutes. The powder was also applied to aluminum substrates with negative polarity at 60–70 KV and baked 450° F. for 5 minutes. Coating prepared by both methods showed good film formation, and average roughness of 6.2 microns, and a 60 degree gloss values of 21–22.

In all the above examples, all relative quantities of monomers provided are in percent by weight.

60° Gloss was determined according to ASTM D523-89 a Standard Test Method for Specular Gloss. This test measures the specular (mirror) reflectance from a reference in comparison to a black glass standard. The 60° angle is used for medium gloss specimens and was used for the specimen tests reported in the application.

EXAMPLE 9

PVDF Homopolymer Based AMF Co-spray Dried With Commercial Titanium Dioxide Slurry

| Weight % | Component |
|---|---|
| 95.1% | AMF latex: 35.8% solids, PVDF (13 Kpoise) (80 parts) /MMA/EA = (14 parts/6 parts) |
| 4.9% | DuPont Ti-Pure R-746: 76.7% solids (titanium dioxide slurry in water) |

Components were blended under slow agitation while being fed directly into a Bowen BLSA spray drier.

Recovered material was a fine white powder with 96% pass through a 125 micron sieve. Powder sieved at 125 microns was electrostatically sprayed onto chromated aluminum substrates with negative polarity at 60–70 KV and fused at 450° F. for 10 minutes to produce homogeneous opaque white coatings with general physical properties as shown below compared to a commercial PVDF powder coating which was produced by melt extrusion, cryogenic grinding, and sieving.

| Test | White Commercial PVDF Powder Coating | White AMF Powder Coating |
|---|---|---|
| Pencil Hardness (ASTM D3363) | H | H |
| Pendulum Hardness (ASTM D4366) | 123 seconds | 127 seconds |
| Crosshatch Adhesion (ASTM D3359) | 4B | 4B |
| 60 in. lbs. Direct Impact (ASTM D2794) | Pass | Pass |
| 60 in. lbs. Reverse Impact (ASTM D2794) | Pass | Pass |
| T-bend Flexibility (ASTM D4145) | Pass OT | Pass OT |
| MEK Rub Resistance (cycles) | 450 | 623 |
| 60 Degree Gloss (ASTM D523) | 38 | 30 |

The subject matter which applicants regard as their invention is particularly pointed out and distinctly claimed as follows:

We claim:

1. An improved blend of polyvinylidene fluoride based polymer, acrylic polymer and pigment useful for powder coatings which avoids the necessity for cryogenic grinding in the preparation of said improved composition wherein the improvement comprises the polyvinylidene fluoride polymer and the acrylic polymer being combined as an acrylic modified fluoropolymer wherein said acrylic modified fluoropolymer is the solid resin prepared by polymerizing ethylenically unsaturated monomers selected from the group comprising acrylic acid, acrylic acid esters, methacrylic acid, methacrylic acid esters and mixtures thereof in the presence of a latex of vinylidene fluoride homo-or co-polymers.

2. An improved blend as defined in claim 1 wherein the pigment is combined with the acrylic modified fluoropolymer when the acrylic modified fluoropolymer is suspended as a latex.

3. A process for the preparation of an article of manufacture comprising a substrate coated on at least one surface thereof which process comprises applying a layer of the improved blend of claim 2 on said at least one surface of said substrate and coalescing said layer into a fixed coating by application of heat.

4. An improved blend as defined in claim 1 wherein the acrylic modified fluoropolymer and the pigment are combined as dry powders.

5. A process for the preparation of the improved blend of claim 1 comprising the following steps:

Step a: recovering the solids from an acrylic modified fluoropolymer latex;

Step b: if necessary, converting the solids recovered in Step a to the desired particle size by a process selected from milling, sieving, or a combination thereof; and Step c: combining the solids in the desired particle size, prepared in Step a, or optional Step b, with pigment particles to obtain the improved blend of claim 1.

6. A process for the preparation of an improved blend as defined in claim 1 comprising the following steps:

Step a: dispensing pigment in a latex of acrylic modified fluoropolymer to create a first mixture;

Step b: recovering the solids from the first mixture of Step a to obtain the solids from said first mixture as a powder, and, optionally, if necessary, Step c: obtaining the improved blend of claim 1 in the desired particle size by a particle size selection process selected from milling, sieving or a combination thereof.

7. A process for the preparation of an article of manufacture comprising a substrate coated on at least one surface thereof which process comprises applying a layer of an unpigmented acrylic modified fluoropolymer powder coating composition on said at least one surface of said substrate and coalescing said layer into fixed coating by application of heat wherein the acrylic modified fluoropolymer is an acrylic modified fluoropolymer as defined in claim 1.

* * * * *